US012062347B2

(12) United States Patent
Shigeta

(10) Patent No.: US 12,062,347 B2
(45) Date of Patent: Aug. 13, 2024

(54) DISPLAY DRIVER AND DISPLAY DEVICE

(71) Applicant: LAPIS Semiconductor Co., Ltd., Yokohama (JP)

(72) Inventor: Kenichi Shigeta, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 17/383,370

(22) Filed: Jul. 22, 2021

(65) Prior Publication Data

US 2022/0028349 A1 Jan. 27, 2022

(30) Foreign Application Priority Data

Jul. 27, 2020 (JP) ................................ 2020-126396

(51) Int. Cl.

*G09G 5/10* (2006.01)
*G09G 3/36* (2006.01)
*H02H 5/04* (2006.01)

(52) U.S. Cl.

CPC ....... *G09G 3/3696* (2013.01); *G09G 2310/08* (2013.01); *G09G 2320/0233* (2013.01); *G09G 2320/0252* (2013.01); *G09G 2320/041* (2013.01)

(58) Field of Classification Search

CPC ............. G09G 3/3696; G09G 2310/08; G09G 2320/0233; G09G 2320/0252; G09G 2320/041; G09G 5/00; G09G 5/06; G09G 5/10; G09G 3/14; G09G 3/20; G09G 3/30; G09G 3/32; G09G 3/334; G09G 3/36; G09G 3/3225; G09G 3/3291; G06F 3/038; H02H 1/00; H02H 5/04; H02H 7/20; G02F 1/1333

See application file for complete search history.

(56) References Cited

U.S. PATENT DOCUMENTS

2005/0225522 A1* 10/2005 Wu ...................... G09G 3/3648 345/87
2006/0158415 A1* 7/2006 Izumi .................. G09G 3/3648 345/98
2007/0097064 A1* 5/2007 Okita .................. G09G 3/3648 345/101
2014/0375620 A1* 12/2014 Chen ........................ G09G 3/20 345/212

(Continued)

FOREIGN PATENT DOCUMENTS

JP 2011112970 A 6/2011
JP 2019040036 A 3/2019

*Primary Examiner* — Chanh D Nguyen
*Assistant Examiner* — Nguyen H Truong
(74) *Attorney, Agent, or Firm* — Rabin & Berdo. P.C.

(57) ABSTRACT

A display driver according to the present invention generates a plurality of driving voltages based on a video signal and applies the respective driving voltages to a plurality of source lines of a display panel. The display driver includes an overdrive part and an overdrive control circuit. The overdrive part executes an overdrive processing to increase amplitudes of the driving voltages. The overdrive control circuit detects an internal temperature of the display driver and stops the overdrive processing by the overdrive part when the temperature is higher than a predetermined temperature threshold.

9 Claims, 5 Drawing Sheets

(56) References Cited

U.S. PATENT DOCUMENTS

| | | | | |
|---|---|---|---|---|
| 2015/0213770 | A1* | 7/2015 | Baek | G09G 3/3688<br>345/99 |
| 2016/0104450 | A1* | 4/2016 | Lee | G09G 3/3688<br>345/211 |
| 2019/0339564 | A1* | 11/2019 | Wu | G09G 3/3674 |
| 2019/0340993 | A1* | 11/2019 | Lai | G09G 3/3674 |
| 2020/0302883 | A1* | 9/2020 | Watanabe | G09G 3/3607 |
| 2021/0312847 | A1* | 10/2021 | Liao | G09G 3/20 |

* cited by examiner

DISPLAY DRIVER AND DISPLAY DEVICE

BACKGROUND

1. Technical Field

The present invention relates to a display driver that generates a drive signal for driving a display panel on the basis of a video signal, and a display device that includes the display driver.

2. Related Art

A liquid crystal display device as a display device includes a liquid crystal display panel and a display driver that drives the liquid crystal display panel. The display driver generates a drive signal having a voltage value corresponding to a luminance indicated by a video signal and supplies the drive signal to the liquid crystal display panel. In the liquid crystal display panel, when the drive signal is received, voltage values of the drive signal are written to respective pixels, and lights are emitted from the pixels at the luminance levels corresponding to the written voltage values.

Recently, because of a reduced horizontal scanning period in accordance with a larger screen and higher definition of the liquid crystal display panel, high speed processing has been required for the display driver that drives the liquid crystal display panel.

That is, since the liquid crystal display panel has capacitances, a response time from the reception of the drive signal until each of the pixels reaches a state of the voltage value of the drive signal becomes relatively long. Accordingly, when the horizontal scanning period becomes short and the voltage value of the drive signal does not reach a desired voltage value in the horizontal scanning period, a display at the luminance level is no longer performed based on the video signal.

Therefore, recently, in a high definition liquid crystal display device, driving a liquid crystal display panel by a drive signal having a voltage value corresponding to a luminance higher (or lower) than a luminance indicated by a video signal, what is called an overdrive is employed, thereby seeking to improve the response speed.

As a liquid crystal display device that employs the overdrive, there has been proposed a liquid crystal display device that includes a temperature sensor for measuring a temperature of a liquid crystal display panel outside the liquid crystal display device to adjust an overdrive amount on the basis of the temperature of the liquid crystal display panel (for example, see JP-A-2019-40036). The overdrive disclosed in JP-A-2019-40036 is focused on the response speed of the liquid crystal increased when the temperature of the liquid crystal display panel is high, and the overdrive amount is decreased as the temperature of the liquid crystal display panel increases, thereby homogenize the response speed regardless of the temperature of the liquid crystal display panel.

SUMMARY

As the above-described amount of the overdrive is increased, that is, an amplitude of the drive signal is increased, the response speed of the display driver can be increased.

However, as the overdrive amount is increased, an electric power consumed by the display driver increases, thus causing heat generation of the display driver. When the display driver continues to operate in the high temperature state, there is an increased possibility that the display driver does not normally operate, and a problem arises in that an image degradation occurs.

Therefore, it is an object of the present invention to provide a display driver that allows a high-speed response process while reducing an image degradation due to heat generation, and a display device that includes the display driver.

A display driver according to the present invention is a display driver that receives a video signal, generates a plurality of driving voltages based on the video signal, and applies the respective driving voltages to a plurality of source lines of a display panel. The display driver includes an overdrive part and an overdrive control circuit. The overdrive part performs an overdrive processing to increase respective amplitudes of the plurality of driving voltages. The overdrive control circuit detects an internal temperature of the display driver and stops the overdrive processing by the overdrive part when the temperature is higher than a predetermined temperature threshold.

A display device according to the present invention includes a display panel, a timing control part, and a driver IC. The display panel includes a plurality of source lines on each of which a plurality of pixels is formed. The timing control part receives a video signal, generates a plurality of pixel data pieces that indicate luminance levels of respective pixels based on the video signal, and outputs a series of pixel data pieces in which an overdrive processing is performed on each of the pixel data pieces. The luminance levels indicated by the pixel data pieces are increased or decreased in the overdrive processing. The driver IC generates a plurality of driving voltages having respective voltage values corresponding to the luminance levels indicated by the respective pixel data pieces based on the series of the pixel data pieces output from the timing control part and applies the plurality of driving voltages to the plurality of source lines of the display panel. The driver IC includes an overdrive control circuit that detects an internal temperature of the driver IC and stops the overdrive processing by the timing control part when the temperature is higher than a predetermined temperature threshold.

In the present invention, the display driver generates the driving voltages based on the video signal and applies the driving voltages to the source lines of the display panel. To the display driver, its internal temperature is detected, and when the temperature becomes higher than a predetermined temperature threshold, the overdrive processing to increase the amplitude of the driving voltage is stopped. Accordingly, the overdrive processing to increase the response speed of the display driver can be executed while reducing the temperature of the display driver to the predetermined temperature threshold or less.

According to the present invention, the response speed of the display driver can be increased while suppressing the image degradation due to the heat generation of the display driver.

DETAILED DESCRIPTION

The following describes embodiments of the present invention in detail with reference to the drawings.

Embodiment 1

Figure 1:
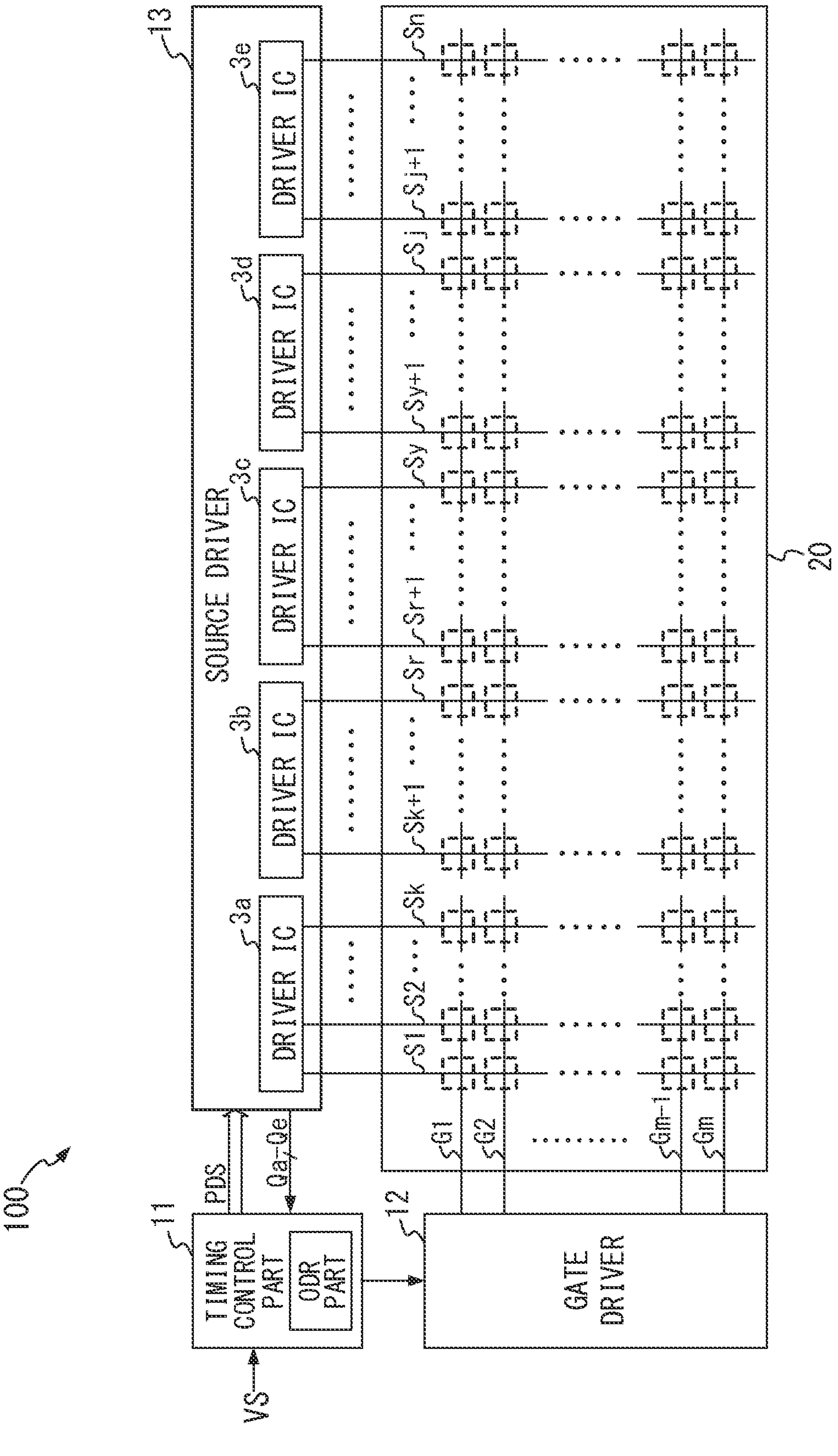
FIG. 1 is a drawing illustrating a schematic configuration of a display device 100 as an exemplary display device that includes a display driver according to the present invention.

FIG. 1 is a drawing illustrating an exemplary schematic configuration of a display device 100 as an exemplary display device that includes a display driver according to the present invention. As illustrated in FIG. 1, the display device 100 includes a timing control part 11, a gate driver 12, a source driver 13, and a display panel 20.

The display panel 20 includes a capacitive image display panel, such as a liquid crystal or organic EL panel. The display panel 20 includes m (m is an integer of 2 or more) gate lines G1 to Gm each extending in a horizontal direction of a two-dimensional screen and n (n is an integer of 2 or more) source lines S1 to Sn each extending in a vertical direction of the two-dimensional screen. Display cells that serve as pixels are formed at respective intersecting portions of the gate lines and the source lines.

The timing control part 11 receives a video signal VS, extracts a horizontal synchronization signal from the video signal VS, and supplies the horizontal synchronization signal to the gate driver 12. The timing control part 11 generates a series of pixel data pieces that indicates luminance levels of the respective pixels by, for example, 8-bit data based on the video signal VS.

The timing control part 11 includes an overdrive (ODR) part that executes, for example, an overdrive processing described below to the pixel data pieces.

First, the ODR part calculates an overdrive amount corresponding to a change amount of a luminance level indicated by each pixel data piece for each of a pair of pixel data pieces that corresponds to a pair of pixels mutually adjacent in the vertical direction of the two-dimensional screen.

Next, the ODR part adds or subtracts the above-described overdrive amount to or from a later pixel data piece of the pair of pixel data pieces in one horizontal scanning period. That is, when the luminance indicated by the later pixel data piece of the pair of pixel data pieces is larger than the luminance indicated by the prior pixel data piece, the ODR part adds the overdrive amount corresponding to the luminance change amount between both pixel data pieces to the later pixel data piece. When the luminance indicated by the later pixel data piece is equal to or less than the luminance indicated by the prior pixel data piece, the ODR part subtracts the overdrive amount corresponding to the change amount between both pixel data pieces from the later pixel data piece.

Thus, the ODR part performs the overdrive processing in which the overdrive amount is added to or subtracted from the pixel data piece for each pair of pixels mutually adjacent in the vertical direction of the two-dimensional screen. The overdrive amount has a magnitude corresponding to the luminance change amount between the pair of pixel data pieces that correspond to the pair of pixels. This overdrive processing increases the response speed of the source driver.

The timing control part 11 generates a series of pixel data PD in which the respective pixel data pieces to which the overdrive processing has been performed are arranged in a predetermined order.

When at least one of temperature abnormality signals Qa, Qb, Qc, Qd, and Qe supplied from the source driver 13 indicates a temperature abnormality presence, the timing control part 11 does not perform the overdrive processing to the pixel data piece group corresponding to that temperature abnormality signal. That is, the timing control part 11 includes the pixel data piece corresponding to the video signal VS as it is into the series of the pixel data PD as the pixel data PD.

Furthermore, the timing control part 11 generates a reference timing signal that indicates a reference timing for generating a clock signal, and a load signal indicating a fetch start timing of the pixel data.

The timing control part 11 supplies the source driver 13 with an image data signal PDS in which the reference timing signal and the load signal are included in the series of the pixel data PD.

The gate driver 12 generates a gate pulse in synchronization with the horizontal synchronization signal supplied from the timing control part 11, and sequentially applies the gate pulse to each of the gate lines G1 to Gm of the display panel 20.

The source driver 13 generates driving voltages having voltage values corresponding to the luminance levels indicated by respective pieces of the pixel data PD in the image data signal PDS and applies the driving voltages to the source lines S1 to Sn of the display panel 20.

The source driver 13 includes five driver ICs 3*a* to 3*e* that are each an independent semiconductor Integrated Circuit (IC) chip. The driver IC 3*a* drives the source lines S1 to Sk (k is an integer of 2 or more) among the source lines S1 to Sn of the display panel 20. The driver IC 3*b* drives the source lines Sk+1 to Sr (r is an integer of 2 or more). The driver IC 3*c* drives the source lines Sr+1 to Sy (y is an integer of 2 or more). The driver IC 3*d* drives the source lines Sy+1 to Sj (j is an integer of 2 or more). The driver IC 3*e* drives the source lines Sj+1 to Sn. The driver ICs 3*a* to 3*e* each include the same circuit.

The driver ICs 3*a* to 3*e* each receive the image data signal PDS and fetches the pixel data PD group corresponding to itself from the image data signal PDS in response to the load signal included in the image data signal PDS. Then, the driver ICs 3*a* to 3*e* generate respective driving voltage groups corresponding to the luminance levels indicated by respective pieces of the fetched pixel data PD and apply the driving voltage groups to the respective corresponding source line groups.

For example, the driver IC 3*a* fetches k pieces of the pixel data PD corresponding to the first row to the k-th row of the display panel 20 from the image data signal PDS. Then, the driver IC 3*a* generates the driving voltages X1 to Xk corresponding to the luminance levels indicated by the respective k pieces of the pixel data PD and applies the driving voltages X1 to Xk to the source lines S1 to Sk of the display panel 20, respectively. The driver IC 3*b* fetches (r-k) pieces of the pixel data PD corresponding to the k+1-th row to the r-th row of the display panel 20 from the image data signal PDS. Then, the driver IC 3*b* generates the driving voltages Xk+1 to Xr corresponding to the luminance levels indicated by the respective (r-k) pieces of the pixel data PD and applies the driving voltages Xk+1 to Xr to the source lines Sk+1 to Sr of the display panel 20, respectively. The driver IC 3*c* fetches (y-r) pieces of the pixel data PD corresponding to the r+l-th row to the y-th row of the display panel 20 from the image data signal PDS. Then, the driver IC 3*c* generates the driving voltages Xr+1 to Xy corresponding to the luminance levels indicated by the respective (y-r) pieces of the pixel data PD and applies the driving voltages Xr+1 to Xy to the source lines Sr+1 to Sy of the display panel 20, respectively. The driver IC 3*d* fetches (j-y) pieces of the pixel data PD corresponding to the y+1-th row to the j-th row of the display panel 20 from the image data signal PDS. Then, the driver IC 3*d* generates the driving voltages Xy+1 to Xj corresponding to the luminance levels indicated by the respective (j-y) pieces of the pixel data PD and applies the driving voltages Xy+1 to Xj to the source lines Sy+1 to Sj of the display panel 20, respectively. The driver IC 3*e* fetches (n-j) pieces of the pixel data PD corresponding to the j+1-th row to the n-th row of the display panel 20 from the image data signal PDS. Then, the driver IC 3*e* generates the driving voltages Xj+1 to Xn corresponding to the luminance levels indicated by the respective (n-j) pieces of the pixel data PD and applies the driving voltages Xj+1 to Xn to the source lines Sj+1 to Sn of the display panel 20, respectively.

Furthermore, the driver IC 3*a* outputs the temperature abnormality signal Qa, the driver IC 3*b* outputs the temperature abnormality signal Qb, the driver IC 3*c* outputs the temperature abnormality signal Qc, the driver IC 3*d* outputs the temperature abnormality signal Qd, and the driver IC 3*e* outputs the temperature abnormality signal Qe.

The following describes the configurations of the driver ICs 3*a* to 3*e*.

As described above, the driver ICs 3*a* to 3*e* each include the same circuit. The following describes the circuit formed in each driver IC by extracting the driver IC 3*a*.

Figure 2:
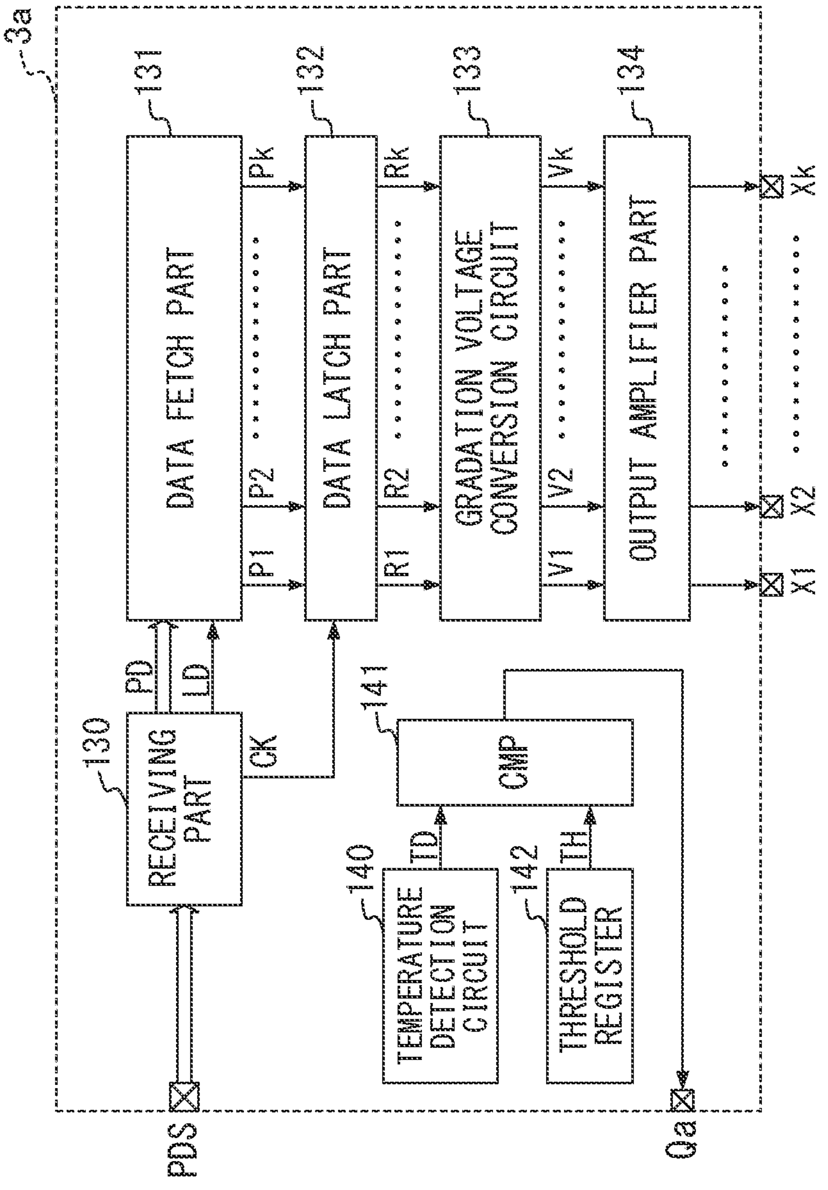
FIG. 2 is a block diagram illustrating an exemplary internal configuration of a driver IC 3*a;*

FIG. 2 is a block diagram illustrating an exemplary circuit formed in the driver IC 3*a*. As illustrated in FIG. 2, the driver IC 3*a* includes a receiving part 130, a data fetch part 131, a data latch part 132, a gradation voltage conversion circuit 133, an output amplifier part 134, a temperature detection circuit 140, a comparator 141, and a threshold register 142.

The receiving part 130 extracts the load signal LD and the series of the pixel data PD from the image data signal PDS and supplies each of them to the data fetch part 131. Furthermore, the receiving part 130 generates a clock signal CK having a cycle of one horizontal scanning period on the basis of the reference timing signal included in the image data signal PDS and supplies the clock signal CK to the data latch part 132.

The data fetch part 131 fetches the pixel data PD corresponding to itself (in the example of FIG. 2, the driver IC 3*a*) from the series of the pixel data PD by k pieces for each in response to the load signal LD. Then, the data fetch part 131 supplies the fetched k pieces of the pixel data PD to the data latch part 132 as the pixel data P1 to Pk.

The data latch part 132 latches the pixel data P1 to Pk at a timing correspond to the clock signal CK and supplies them to the gradation voltage conversion circuit 133 as pixel data R1 to Rk, respectively.

The gradation voltage conversion circuit 133 converts the luminance levels indicated by the respective pixel data R1 to Rk into gradation voltages V1 to Vk having corresponding voltage values, respectively, and supplies the gradation voltages V1 to Vk to the output amplifier part 134.

The output amplifier part 134 amplifies each of the gradation voltages V1 to Vk as required, and outputs them as the driving voltages X1 to Xk. The driving voltages X1 to Xk output from the output amplifier part 134 of the driver IC 3*a* are applied to the source lines S1 to Sk of the display panel 20, respectively. The driving voltages X1 to Xk output from the output amplifier part 134 of the driver IC 3*b* are applied to the source lines Sk+1 to Sr of the display panel 20, respectively. The driving voltages X1 to Xk output from the output amplifier part 134 of the driver IC 3*c* are applied to the source lines Sr+1 to Sy of the display panel 20, respectively.

The temperature detection circuit 140 detects the internal temperature of the driver IC 3*a* (3*b* to 3*e*) as the semiconductor chip, especially, the temperature of the output amplifier part 134 or the temperature around the output amplifier part 134 and supplies a temperature signal TD indicating the detected temperature to the comparator 141.

The threshold register 142 is a register configured to hold a temperature threshold indicating the maximum limit temperature allowable as the temperature of the driver IC 3*a*, and any given value is held as the temperature threshold after the manufacture of the driver IC 3*a*. The threshold register 142 supplies a temperature threshold TH, which is held in itself and indicates the temperature threshold, to the comparator 141.

The comparator 141 compares the temperature threshold TH with the temperature indicated by the temperature signal TD, and outputs a temperature abnormality signal indicative of no temperature abnormality when the temperature signal TD is the temperature threshold TH or less. When the temperature indicated by the temperature signal TD is higher than the temperature threshold TH, the comparator 141 outputs a temperature abnormality signal indicative of temperature abnormality presence. For the temperature threshold, a unique value can be set for each driver IC by the threshold register 142 of each of the driver ICs 3*a* to 3*e*.

As the above-described temperature abnormality signal, the comparator 141 of the driver IC 3*a* outputs the temperature abnormality signal Qa, the comparator 141 of the driver IC 3*b* outputs the temperature abnormality signal Qb, and the comparator 141 of the driver IC 3*c* outputs the temperature abnormality signal Qc. Similarly, as the temperature abnormality signal, the comparator 141 of the driver IC 3*d* outputs the temperature abnormality signal Qd, and the comparator 141 of the driver IC 3*e* outputs the temperature abnormality signal Qe.

That is, the driver ICs 3*a* to 3*e* as the source drivers each include overdrive control circuits (140 to 142) that detect the internal temperature of the driver IC and generate the temperature abnormality signal (Qa to Qe) based on the temperature. The temperature abnormality signals Qa to Qe respectively generated by the overdrive control circuits (140 to 142) in the driver ICs 3*a* to 3*e* are supplied to the timing control part 11.

The following describes an overdrive control.

First, when the internal temperatures of the driver ICs 3*a* to 3*e* are each equal to or less than the predetermined temperature threshold TH, the driver ICs 3*a* to 3*e* supply the temperature abnormality signals Qa to Qe indicative of no temperature abnormality to the timing control part 11. The timing control part 11 having received the temperature abnormality signals Qa to Qe indicative of no temperature abnormality performs the overdrive processing as described above to the series of the pixel data pieces indicating the luminance level of each pixel based on the video signal VS. This makes the change amount of the luminance level large in the series of the pixel data pieces to which the overdrive processing has been performed compared with the series of the pixel data pieces to which the overdrive processing has not been performed. Accordingly, the amplitudes of the driving voltages X1 to Xk generated by the output amplifier part 134 increase, the response speeds of the driver ICs 3*a* to 3*e* increase, and the temperatures of the output amplifier part 134 rise.

Here, when, for example, the temperature abnormality signal Qa among the temperature abnormality signals Qa to Qe transitions to a state of indicating the temperature abnormality presence, the timing control part 11 stops the overdrive processing to the series of the pixel data pieces corresponding to the driver IC 3*a*. That is, the timing control part 11 stops the overdrive processing to the series of the pixel data pieces corresponding to the driver IC 3*a* when the internal temperature of the driver IC 3*a* becomes higher than the temperature threshold TH. Meanwhile, the timing control part 11 continues the overdrive processing to the series of the pixel data pieces corresponding to each of the driver ICs 3*b* to 3*e*.

Accordingly, the amplitudes of the driving voltages X1 to Xk generated by the output amplifier part 134 of the driver IC 3*a* decrease, and in association with this, the temperature of the output amplifier part 134 decreases. Therefore, subsequently, when the internal temperature of the driver IC 3*a* becomes the temperature threshold TH or less, the driver IC 3*a* transitions the temperature abnormality signal Qa from the state of the temperature abnormality presence to the state of no temperature abnormality. Then, according to the temperature abnormality signal Qa indicative of no temperature abnormality, the timing control part 11 starts the overdrive processing to the series of the pixel data pieces corresponding to the driver IC 3*a* again.

According to the overdrive control, even when the internal temperatures of the respective driver ICs 3*a* to 3*e* as the source drivers increase, the internal temperatures can be decreased to the temperature near the predetermined temperature threshold. Accordingly, the present invention ensures the higher speed response by the overdrive while reducing the image degradation due to the heat generation of the source driver.

In the configuration illustrated in FIG. 1 and FIG. 2, the temperature thresholds as the factor of determining whether to execute the overdrive or not can be individually set by the threshold registers 142 included in the respective driver ICs 3*a* to 3*e*.

For example, the temperature threshold held by the threshold register 142 of the driver IC 3*c*, which displays the screen central region that requires the relatively high luminance, is set to be higher than the temperature thresholds of the other driver ICs (3*a*, 3*b*, 3*d*, and 3*e*). This increases the execution frequency of the overdrive processing in the driver IC 3*c*, thus providing the higher speed response compared with the other driver ICs. Accordingly, since the amplitudes of the driving voltages X1 to Xk can be increased in the driver IC 3*c* compared with the other driver ICs, the display with high luminance can be achieved in the screen central region of the display panel 20.

Embodiment 2

Figure 3:
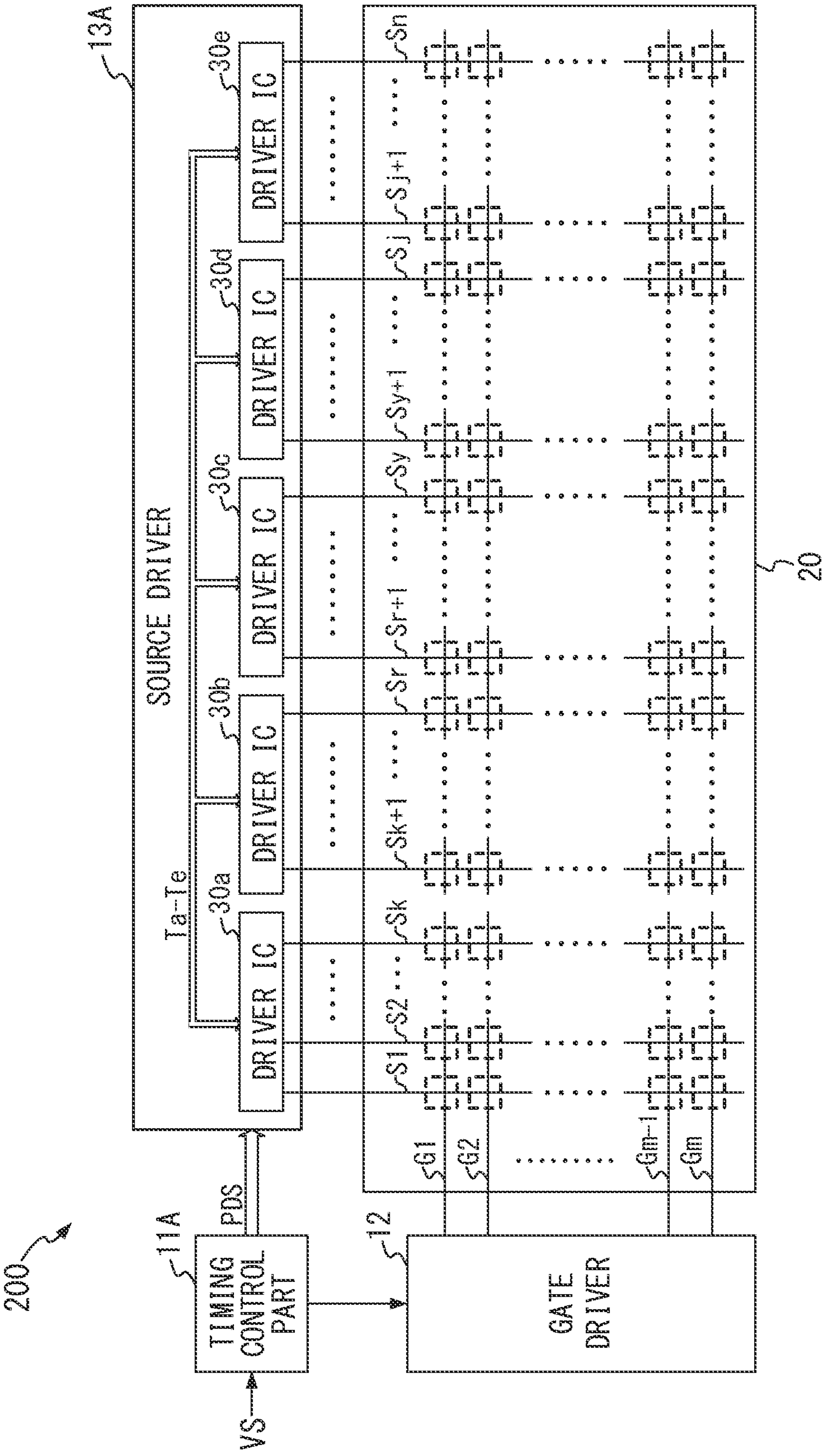
FIG. 3 is a drawing illustrating a schematic configuration of a display device 200 as another example of the display device that includes the display driver according to the present invention.

FIG. 3 is a drawing illustrating an exemplary schematic configuration of a display device 200 as another example of the display device that includes the display driver according to the present invention. In the display device 200 illustrated in FIG. 3, the configuration is the same as that of the display device 100 illustrated in FIG. 1 except that a timing control part 11A is employed instead of the timing control part 11 and a source driver 13A is employed instead of the source driver 13.

The following describes configurations mainly for the timing control part 11A and driver ICs 30*a* to 30*e*.

The timing control part 11A is one in which the function of performing the overdrive processing as described above is omitted from the timing control part 11.

That is, the timing control part 11A receives a video signal VS, extracts a horizontal synchronization signal from the video signal VS, and supplies the horizontal synchronization signal to the gate driver 12.

The timing control part 11A generates a pixel data piece that indicates the luminance of the pixel by 8-bit data or the like for each pixel based on the video signal VS, and generates a series of the pixel data PD in which each of the pixel data pieces are arranged in a predetermined order. Furthermore, the timing control part 11A generates a reference timing signal that indicates a reference timing for generating a clock signal, and a load signal indicating a fetch start timing of the pixel data.

Then, the timing control part 11A supplies the source driver 13A with an image data signal PDS in which the reference timing signal and the load signal are included in the series of the pixel data PD.

Similarly to the source driver 13, the source driver 13A generates driving voltages having voltage values corresponding to the luminance levels indicated by respective pieces of the pixel data PD in the image data signal PDS, and applies the driving voltages to the source lines S1 to Sn of the display panel 20.

Note that, in the source driver 13A, the driver ICs 30*a* to 30*e* are employed instead of the driver ICs 3*a* to 3*e* illustrated in FIG. 1 and FIG. 2.

Similarly to the driver ICs 3*a* to 3*e*, the driver ICs 30*a* to 30*e* are each an independent semiconductor IC chip. Similarly to the driver ICs 3*a* to 3*e*, the driver ICs 30*a* to 30*e* drive the respective divided source line groups (S1 to Sk, Sk+1 to Sr, Sr+1 to Sy, Sy+1 to Sj, and Sj+1 to Sn) obtained by dividing the source lines S1 to Sn of the display panel 20 into five.

The driver ICs 30*a* to 30*e* each include one output terminal to output the temperature signal indicating its internal temperature, and four input terminals to receive the temperature signals indicating the internal temperatures of the respective driver ICs other than itself.

Accordingly, for example, the driver IC 30*a* receives temperature signals Tb to Te respectively output from the driver ICs 30*b* to 30*e* via the wiring, and outputs a temperature signal Ta indicating the internal temperature of itself. The driver IC 30*b* receives the temperature signals Ta and Tc to Te respectively output from the driver ICs 30*a* and 30*c* to 30*e* via the wiring, and outputs the temperature signal Tb indicating the internal temperature of itself. The driver IC 30*c* receives the temperature signals Ta, Tb, Td, and Te respectively output from the driver ICs 30*a*, 30*b*, 30*d*, and 30*e* via the wiring, and outputs the temperature signal Tc indicating the internal temperature of itself. The driver IC 30*d* receives the temperature signals Ta to Tc, and Te respectively output from the driver ICs 30*a* to 30*c*, and 30*e* via the wiring, and outputs the temperature signal Td indicating the internal temperature of itself. The driver IC 30*e* receives the temperature signals Ta to Td respectively output from the driver ICs 30*a* to 30*d* via the wiring, and outputs the temperature signal Te indicating the internal temperature of itself.

The following describes the configurations of the driver ICs 30*a* to 30*e*.

As described above, the driver ICs 30*a* to 30*e* each include the same circuit. The following describes the circuit formed in each driver IC by extracting the driver IC 30*a*.

Figure 4:
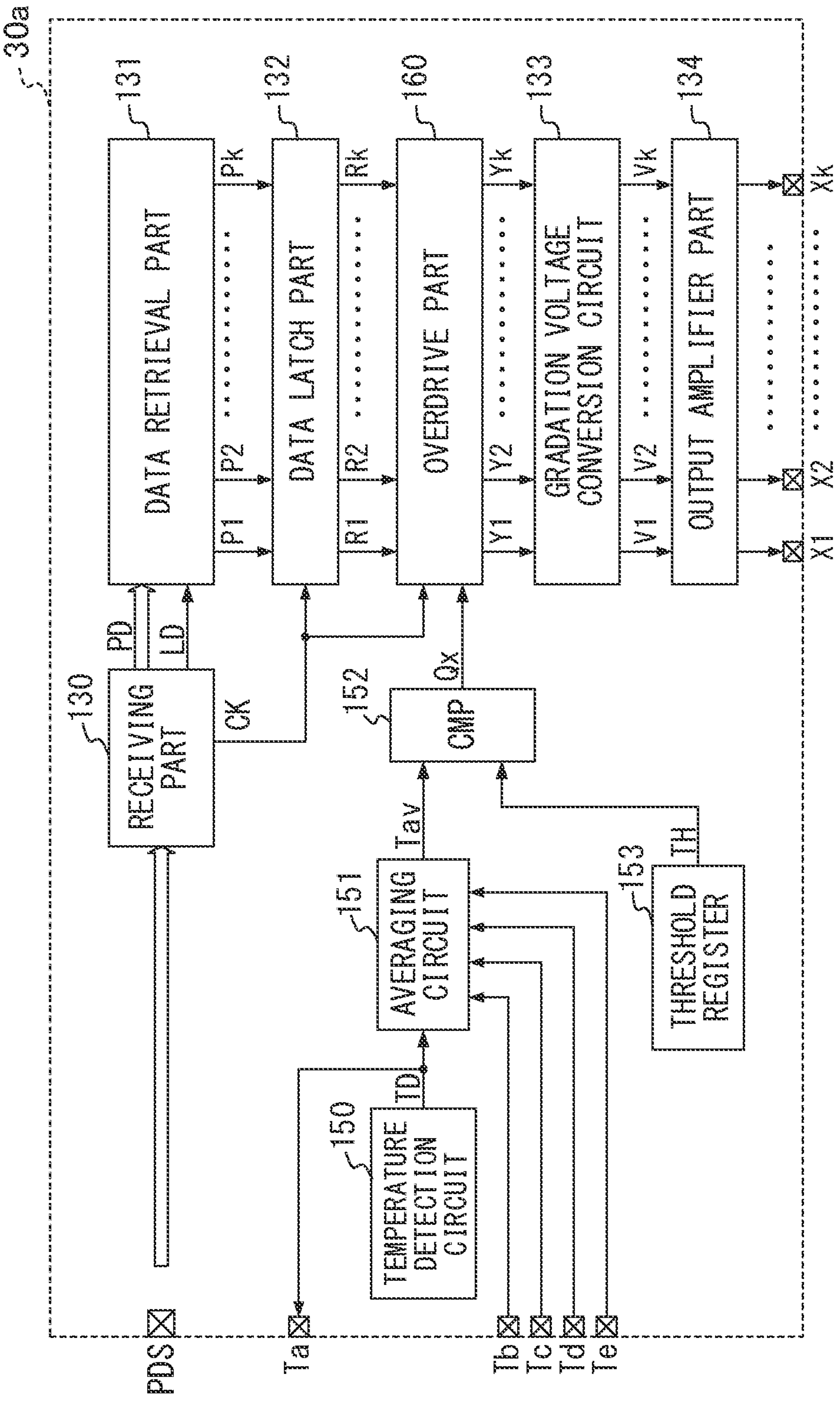
FIG. 4 is a block diagram illustrating an exemplary internal configuration of a driver IC 30*a*.

FIG. 4 is a block diagram illustrating an exemplary circuit formed in the driver IC 30*a*. As illustrated in FIG. 4, similarly to the driver IC 3*a*, the driver IC 30*a* includes a receiving part 130, a data fetch part 131, a data latch part 132, a gradation voltage conversion circuit 133, and an output amplifier part 134.

The driver IC 30*a* employs a temperature detection circuit 150, an averaging circuit 151, a comparator 152, and a threshold register 153 instead of the temperature detection circuit 140 and the comparator 141 illustrated in FIG. 2. Furthermore, the driver IC 30*a* includes an overdrive part 160 between the data latch part 132 and the gradation voltage conversion circuit 133.

In FIG. 4, the receiving part 130 extracts the load signal LD and the series of the pixel data PD from the image data signal PDS and supplies each of them to the data fetch part 131. Furthermore, the receiving part 130 generates a clock signal CK having a cycle of one horizontal scanning period on the basis of the reference timing signal included in the image data signal PDS and supplies the clock signal CK to the data latch part 132 and the overdrive part 160.

The data fetch part 131 fetches the pixel data PD corresponding to itself (in the example of FIG. 4, the driver IC 30*a*) from the series of the pixel data PD by k pieces for each in response to the load signal LD. Then, the data fetch part 131 supplies the fetched k pieces of the pixel data PD to the data latch part 132 as the pixel data P1 to Pk.

The data latch part 132 simultaneously latches the pixel data P1 to Pk at a timing correspond to the clock signal CK and supplies them to the overdrive part 160 as pixel data R1 to Rk, respectively.

The temperature detection circuit 150 detects the internal temperature of the driver IC 30*a*, especially, the temperature of the output amplifier part 134 or the temperature around the output amplifier part 134, and supplies a temperature signal TD indicating the detected temperature to the averaging circuit 151. Furthermore, the temperature detection circuit 150 outputs the temperature signal TD to outside the driver IC 30*a* as the temperature signal Ta indicating the internal temperature of the driver IC 30*a*. Note that the temperature detection circuit 150 of the driver IC 30*b* (or 30*c* to 30*e*) detects the internal temperature of the driver IC 30*b* (or 30*c* to 30*e*). Then, the temperature detection circuit 150 of the driver IC 30*b* (or 30*c* to 30*e*) supplies the temperature signal TD indicating the temperature to the averaging circuit 151, and externally outputs the temperature signal TD as the temperature signal Tb (or Tc to Te) indicating the internal temperature of the driver IC 30*b* (or 30*c* to 30*e*).

The averaging circuit 151 obtains an average of the temperatures indicated by the respective temperature signals Ta to Te, or a weighted average obtained by weighting predetermined weights to the respective temperature signals Ta to Te, and supplies an average temperature Tav indicating the average value or the weighted average value to the comparator 152. When obtaining the weighted average, for example, the averaging circuit 151 increases the weighting to the temperature signal Tc from the driver IC 30*c* that displays the screen central region in which the image degradation is noticeable in the display image.

The threshold register 153 is a register configured to hold a temperature threshold indicating the maximum limit temperature allowable as the temperature of the driver IC 30*a*, and any given value is held as the temperature threshold after the manufacture of the driver IC 30*a*. The threshold register 153 supplies a temperature threshold TH, which is held in itself and indicates the temperature threshold, to the comparator 152.

The comparator 152 compares the temperature threshold TH with the average temperature Tav, and supplies a temperature abnormality signal Qx indicative of no temperature abnormality to the overdrive part 160 when the average temperature Tav is equal to or less than the temperature threshold TH. On the other hand, when the average temperature Tav is higher than the temperature threshold TH, the comparator 152 supplies a temperature abnormality signal Qx indicative of the temperature abnormality presence to the overdrive part 160. For the temperature threshold, a unique value can be set for each driver IC by the threshold register 153 of each of the driver ICs 30*a* to 30*e*.

Thus, the driver ICs 30*a* to 30*e* each include the overdrive control circuits (150 to 153) that detect the internal temperature of the driver IC and control whether to execute the overdrive processing in the overdrive part 160 or not on the basis of the temperature.

When the temperature abnormality signal Qx indicates no temperature abnormality, the overdrive part 160 performs the overdrive processing to the pixel data R1 to Rk supplied from the data latch part 132, and supplies them to the gradation voltage conversion circuit 133 as pixel data Y1 to Yk.

Figure 5:
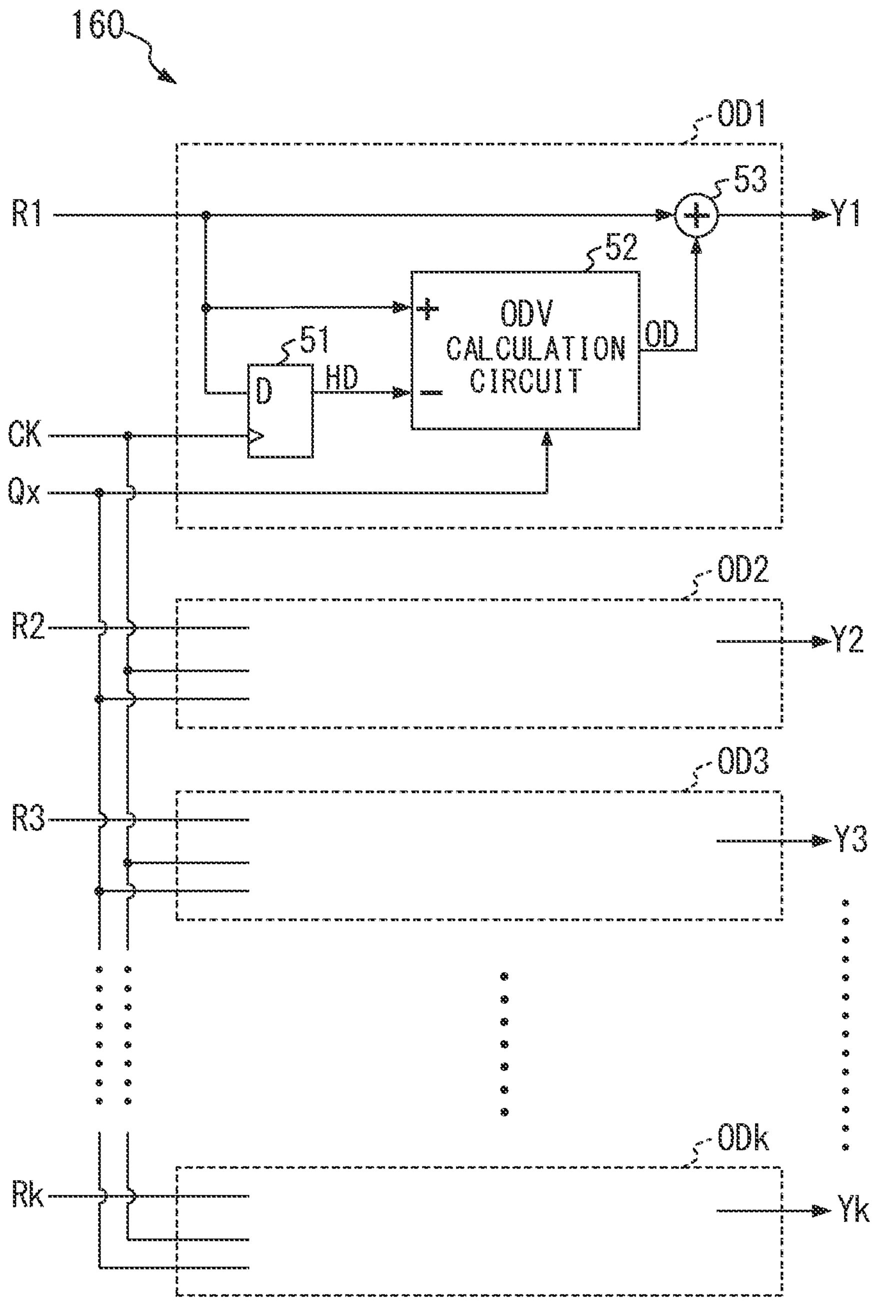
FIG. 5 is a circuit diagram illustrating an exemplary internal configuration of an overdrive part 160.

FIG. 5 is a circuit diagram illustrating an exemplary internal configuration of the overdrive part 160.

As illustrated in FIG. 5, the overdrive part 160 includes overdrive circuits OD1 to ODk respectively disposed corresponding to the pixel data R1 to Rk. The overdrive circuits OD1 to ODk each have the same circuit configuration, and each include, for example, as illustrated in FIG. 5, a delay element 51, an overdrive amount calculation circuit 52 (hereinafter referred to as an ODV calculation circuit 52), and an adder 53.

The following describes the circuit configuration with an example of the overdrive circuit OD1.

The delay element 51 includes a D flip-flop and the like, and is configured to delay the pixel data R1 (or R2 to Rk) by one horizontal scanning period in accordance with the clock signal CK and supply it to the ODV calculation circuit 52 as immediately preceding pixel data HD.

When the temperature abnormality signal Qx indicates no temperature abnormality, the ODV calculation circuit 52 subtracts the luminance indicated by the immediately preceding pixel data HD from the luminance indicated by the pixel data R1, thereby obtaining the luminance change amount. The ODV calculation circuit 52 supplies an overdrive amount OD having the magnitude corresponding to the luminance change amount to the adder 53. On the other hand, when the temperature abnormality signal Qx indicates the temperature abnormality presence, the ODV calculation circuit 52 supplies the overdrive amount OD indicating zero to the adder 53.

The adder 53 outputs the pixel data piece indicating the luminance obtained by adding the overdrive amount OD as a luminance correction value to the luminance indicated by the pixel data R1 as the pixel data Y1.

With this configuration, the overdrive circuit OD1 performs the overdrive processing of adding the overdrive amount OD to the pixel data R1 when the temperature abnormality signal Qx indicates no temperature abnormality.

That is, in the overdrive processing, first, the overdrive circuit OD1 obtains the luminance change amount from the immediately preceding pixel data HD, that is, the pixel data R1 one horizontal scanning period before the current pixel data R1, to the current pixel data R1. Then, the overdrive circuit OD1 adds the overdrive amount OD having the magnitude corresponding to the luminance change amount to the current pixel data R1, and outputs the addition result as the pixel data Y1.

That is, when the luminance indicated by the pixel data R1 is higher than the luminance indicated by the pixel data R1 one horizontal scanning period before, the overdrive circuit OD1 outputs the pixel data Y1 obtained by increasing the luminance of the current pixel data R1 by the amount corresponding to the luminance change amount. When the luminance indicated by the pixel data R1 is equal to or less than the luminance indicated by the pixel data R1 one horizontal scanning period before, the overdrive circuit OD1 outputs the pixel data Y1 obtained by decreasing the luminance of the current pixel data R1 by the amount corresponding to the luminance change amount. When the luminance indicated by the pixel data R1 is equal to the luminance indicated by the pixel data R1 one horizontal scanning period before, the overdrive circuit OD1 directly outputs the current pixel data R1 as the pixel data Y1 because the luminance change amount becomes zero.

When the temperature abnormality signal Qx indicates the temperature abnormality presence, the overdrive circuit OD1 directly outputs the current pixel data R1 as the pixel data Y1 regardless of the above-described luminance change amount.

With the configuration illustrated in FIG. 5, when the temperature abnormality signal Qx indicates no temperature abnormality, the overdrive part 160 supplies the pixel data R1 to Rk to which the overdrive processing has been performed to the gradation voltage conversion circuit 133 as the pixel data Y1 to Yk. On the other hand, when the temperature abnormality signal Qx indicates the temperature abnormality presence, the overdrive part 160 directly supplies the pixel data R1 to Rk to the gradation voltage conversion circuit 133 as the pixel data Y1 to Yk.

The gradation voltage conversion circuit 133 converts the luminance levels indicated by the respective pixel data Y1 to Yk into gradation voltages V1 to Vk having corresponding voltage values, respectively, and supplies the gradation voltages V1 to Vk to the output amplifier part 134.

The output amplifier part 134 amplifies each of the gradation voltages V1 to Vk as required and outputs them as the driving voltages X1 to Xk. The driving voltages X1 to Xk output from the output amplifier part 134 of the driver IC 30*a* are applied to the source lines S1 to Sk of the display panel 20, respectively. The driving voltages X1 to Xk output from the output amplifier part 134 of the driver IC 30*b* are applied to the source lines Sk+1 to Sr of the display panel 20, respectively. The driving voltages X1 to Xk output from the output amplifier part 134 of the driver IC 30*c* are applied to the source lines Sr+1 to Sy of the display panel 20, respectively.

The following describes the overdrive control in the display device 200 illustrated in FIG. 3 to FIG. 5.

First, when the average value or a weighted average value (Tav) of the respective internal temperatures (Ta to Te) of the driver ICs 30*a* to 30*e* as the source drivers is the temperature threshold TH or less, the comparator 152 illustrated in FIG. 4 supplies the temperature abnormality signal Qx indicative of no temperature abnormality to the overdrive part 160. This causes the overdrive part 160 to perform the overdrive processing as described below.

That is, first, the overdrive part 160 calculates the overdrive amounts OD corresponding to the change amounts of the luminance levels between the pixel data R1 to Rk supplied from the data latch part 132 and the pixel data R1 to Rk supplied one horizontal scanning period before, respectively. Then, the overdrive part 160 adds or subtracts the overdrive amounts OD calculated for the respective pixel data R1 to Rk to or from the pixel data R1 to Rk, and supplies them to the gradation voltage conversion circuit 133 of the next stage as the pixel data Y1 to Yk. Thus, the change amounts of the luminance levels at the pixel data Y1 to Yk are increased compared with the pixel data R1 to Rk. In accordance with this, the amplitudes of the driving voltages X1 to Xk generated by the output amplifier part 134 increase, the response speeds of the driver ICs 30*a* to 30*e* increase, and the temperature of the output amplifier part 134 rises.

When the average value or the weighted average value (Tav) of the internal temperatures (Ta to Te) of the respective driver ICs 30*a* to 30*e* as the source drivers become higher than the temperature threshold TH, the comparator 152 supplies the temperature abnormality signal Qx indicative of the temperature abnormality presence to the overdrive part 160. Accordingly, the overdrive part 160 stops the above-described overdrive processing, and directly supplies the pixel data R1 to Rk supplied from the data latch part 132 to the gradation voltage conversion circuit 133 as the pixel data Y1 to Yk. Accordingly, the amplitudes of the driving voltages X1 to Xk generated by the output amplifier part 134 decrease, thus decreasing the temperature of the output amplifier part 134. Accordingly, subsequently, when the average value or the weighted average value of the internal temperatures of the driver ICs 30*a* to 30*e* becomes the temperature threshold TH or less, the comparator 152 supplies the temperature abnormality signal Qx indicative of no temperature abnormality to the overdrive part 160. Then, corresponding to the temperature abnormality signal Qx indicative of no temperature abnormality, the overdrive part 160 starts the overdrive processing again.

Therefore, according to the overdrive control, even when the internal temperatures of the respective driver ICs 30*a* to 30*e* as the source drivers increase, the internal temperatures can be decreased to the temperature near the predetermined temperature threshold. Accordingly, the present invention ensures the higher speed response by the overdrive while reducing the image degradation due to the heat generation of the source driver.

In the display device 200 illustrated in FIG. 3 to FIG. 5, since the overdrive processing can be performed inside each of the driver ICs 30*a* to 30*e* as the source drivers, the timing control part 11A without the overdrive function can be employed.

The display device 200 illustrated in FIG. 3 to FIG. 5 includes the overdrive control circuit that detects the internal temperature of the driver IC and control whether to execute the overdrive processing or not on the basis of the internal temperature together with the overdrive part 160 in each of the driver ICs 30*a* to 30*e*. In view of this, compared with the one that performs the overdrive processing by the timing control part 11 as the display device 100 illustrated in FIG. 1 and FIG. 2, when the rapid temperature rise in the driver IC occurs, the temperature can be quickly decreased to the temperature near the predetermined temperature threshold.

In the example illustrated in FIG. 1 or FIG. 3, while the timing control part 11 (11A) is disposed outside the source driver 13, the timing control part 11 (11A) may be configured as a part of the driver.

In the overdrive part described in the embodiments, the overdrive processing as described above is performed on the pixel data PD, thereby increasing the amplitudes of the driving voltages X1 to Xk. However, the configuration of the overdrive processing is not limited insofar as the amplitudes of the driving voltages X1 to Xk are increased.

In short, it is only necessary to employ a display driver that includes an overdrive part and an overdrive control circuit described below as a display driver (for example, 11, 11A, 13, and 13A) that receives a video signal (VS), generates a plurality of driving voltages (for example, X1 to Xk) based on the video signal, and applies the driving voltages to a plurality of source lines (for example, S1 to Sk) of the display panel (20), respectively.

The overdrive part (for example, 11, 160) executes the overdrive processing to increase the respective amplitudes of the plurality of driving voltages. The overdrive control circuits (for example, 140 to 142, 150 to 153) detect the internal temperatures of the display drivers (for example, 3*a* to 3*e*, 30*a* to 30*e*), and stop the overdrive processing by the overdrive part when the temperature is higher than the predetermined temperature threshold (TH).

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. This application is based upon and claims the benefit of priority from the prior Japanese Patent Application No. 2020-126396 filed on Jul. 27, 2020, the entire contents of which are incorporated herein by reference.

What is claimed is:

1. A display driver that receives a video signal, generates a plurality of driving voltages corresponding to each of pixel data pieces indicating luminance levels of respective pixels based on the video signal, and applies respective driving voltages to a plurality of source lines of a display panel, the display driver comprising:

an overdrive part that performs an overdrive processing on the pixel data pieces to increase or decrease the luminance levels indicated by the pixel data pieces;

a gradation voltage conversion circuit that receives the pixel data pieces and converts the received pixel data pieces into the driving voltages; and an overdrive control circuit that detects an internal temperature of the display driver, determines that a temperature abnormality has occurred when the internal temperature is higher than a predetermined temperature threshold and stops the overdrive processing by the overdrive part when it is determined that the temperature abnormality has occurred, wherein the overdrive part supplies the pixel data pieces that have not been processed by the overdrive processing to the gradation voltage conversion circuit when the overdrive processing is stopped.

2. The display driver according to claim 1, further comprising a timing control part that generates a series of the pixel data pieces based on the video signal.

3. The display driver according to claim 2, wherein in the overdrive processing, the overdrive part obtains an overdrive amount for each pair of pixels mutually adjacent in a vertical direction of a two-dimensional screen in the display panel, adds or subtracts the overdrive amount to or from one of a pair of pixel data pieces, the overdrive amount corresponding to a change amount of the luminance level between the pair of pixel data pieces corresponding to the pair of pixels.

4. The display driver according to claim 2, further comprising a driver IC that fetches the series of the pixel data pieces generated by the timing control part, and generates a plurality of voltages having voltage values corresponding to respective pixel data pieces as the plurality of driving voltages, wherein the driver IC internally includes the overdrive control circuit, and the timing control part includes the overdrive part.

5. The display driver according to claim 4, wherein the overdrive control circuit includes:

a temperature detection circuit that detects an internal temperature of the driver IC;

a register that holds the temperature threshold; and a comparator that supplies a temperature abnormality signal to the timing control part, the temperature abnormality signal indicating no temperature abnormality when the internal temperature of the driver IC is equal to or less than the temperature threshold held in the register and indicating a temperature abnormality presence when the internal temperature of the driver IC is higher than the temperature threshold held in the register, and the overdrive part stops the overdrive processing when the overdrive part receives the temperature abnormality signal indicating the temperature abnormality presence.

6. The display driver according to claim 2, further comprising a driver IC that fetches the series of the pixel data pieces generated by the timing control part, and generates a plurality of voltages having voltage values corresponding to respective pixel data pieces as the plurality of driving voltages, wherein the driver IC internally includes the overdrive part and the overdrive control circuit.

7. The display driver according to claim 6, wherein the driver IC includes a first to an N-th (N is an integer of 2 or more) driver ICs respectively disposed corresponding to a first to an N-th source line groups, the plurality of source lines being divided into N source line groups, the first to the N-th driver ICs each include the overdrive part and the overdrive control circuit, the overdrive control circuit includes:

a temperature detection circuit that detects an internal temperature of the driver IC and generates a temperature signal that indicates the detected internal temperature of the driver IC;

an averaging circuit that obtains an average value or a weighted average value of respective temperature signals detected by the temperature detection circuits of respective first to the N-th driver ICs; and a comparator that supplies a temperature abnormality signal to the overdrive part, the temperature abnormality signal indicating no temperature abnormality when the average value or the weighted average value is equal to or less than the temperature threshold, the temperature threshold being held in a register and indicating a temperature abnormality presence when the average value or the weighted average value is higher than the temperature threshold held in the register, and the overdrive part stops the overdrive processing when the overdrive part receives the temperature abnormality signal indicating the temperature abnormality presence.

8. A display driver comprising:

a timing control part that receives a video signal, generates a plurality of pixel data pieces that indicate luminance levels of respective pixels based on the video signal, and outputs a series of pixel data pieces for which is performed an overdrive processing to increase or decrease the luminance levels indicated by each of the generated pixel data pieces; and a driver IC that generates a plurality of driving voltages having respective voltage values corresponding to the luminance levels indicated by respective pixel data pieces on the basis of the series of the pixel data pieces output from the timing control part and applies the plurality of driving voltages to a plurality of source lines of a display panel, wherein the driver IC includes an overdrive control circuit that detects an internal temperature of the driver IC, determines that a temperature abnormality has occurred when the internal temperature is higher than a predetermined temperature threshold and stops the overdrive processing by the timing control part when it is determined that the temperature abnormality has occurred, and wherein the timing control part supplies pixel data pieces that have not been processed by the overdrive processing to the driver IC when the overdrive processing is stopped.

9. A display device comprising:

a display panel that includes a plurality of source lines on each of which a plurality of pixels is formed;

a timing control part that receives a video signal, generates a plurality of pixel data pieces that indicate luminance levels of respective pixels on the basis of the video signal, and outputs a series of pixel data pieces for which is performed an overdrive processing to increase or decrease the luminance levels indicated by the generated each of the pixel data pieces; and a driver IC that generates a plurality of driving voltages having respective voltage values corresponding to the luminance levels indicated by respective pixel data pieces based on the series of the pixel data pieces output from the timing control part, and applies the plurality of driving voltages to the plurality of source lines of the display panel, wherein the driver IC includes an overdrive control circuit that detects an internal temperature of the driver IC, determines that a temperature abnormality has occurred when the internal temperature is higher than a predetermined temperature threshold and stops the overdrive processing by the timing control part when it is determined that the temperature abnormality has occurred, and wherein the timing control part supplies pixel data pieces that have not been processed by the overdrive processing to the driver IC when the overdrive processing is stopped.

* * * * *